United States Patent
Xing et al.

(10) Patent No.: US 11,201,774 B2
(45) Date of Patent: Dec. 14, 2021

(54) UPLINK WAVEFORM ACQUISITION METHOD, UPLINK WAVEFORM FEEDBACK METHOD, TERMINAL AND BASE STATION

(71) Applicant: CHINA ACADEMY OF TELECOMMUNICATIONS TECHNOLOGY, Beijing (CN)

(72) Inventors: Yanping Xing, Beijing (CN); Tony Ekpenyong, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 30 days.

(21) Appl. No.: 16/347,799

(22) PCT Filed: Nov. 2, 2017

(86) PCT No.: PCT/CN2017/109141
§ 371 (c)(1),
(2) Date: May 6, 2019

(87) PCT Pub. No.: WO2018/086480
PCT Pub. Date: May 17, 2018

(65) Prior Publication Data
US 2019/0296954 A1    Sep. 26, 2019

(30) Foreign Application Priority Data
Nov. 8, 2016    (CN) .......................... 201610981264.9

(51) Int. Cl.
*H04L 27/00*    (2006.01)
*H04W 92/10*    (2009.01)
*H04L 27/26*    (2006.01)

(52) U.S. Cl.
CPC ...... *H04L 27/2627* (2013.01); *H04L 27/0008* (2013.01); *H04L 27/2636* (2013.01); *H04W 92/10* (2013.01)

(58) Field of Classification Search
CPC ............ H04L 27/2627; H04L 27/0008; H04L 27/2636; H04L 25/03834; H04L 27/2647;
(Continued)

(56) References Cited

U.S. PATENT DOCUMENTS

2008/0095263 A1    4/2008    Xu et al.
2010/0091919 A1    4/2010    Xu et al.
(Continued)

FOREIGN PATENT DOCUMENTS

CN    102377536 A    3/2012
CN    103298090 A    9/2013
(Continued)

OTHER PUBLICATIONS

Powerpoint slides on "5G Waveform & Multiple Access Techniques" published Nov. 4, 2015 (Year: 2015).*
(Continued)

*Primary Examiner* — Nishant Divecha
(74) *Attorney, Agent, or Firm* — Ladas & Parry, LLP

(57) ABSTRACT

An uplink waveform acquisition method, an uplink waveform feedback method, a terminal, and a base station are provided. The acquisition method includes: acquiring an uplink waveform for information transmission of a terminal; and performing information transmission according to the uplink waveform, wherein, the acquiring the uplink waveform, includes: determining the uplink waveform for current information transmission of the terminal, according to correspondence between uplink waveforms and preset conditions in communication protocols; or receiving information about the uplink waveform for information transmission of
(Continued)

the terminal, the information about the uplink waveform being determined for the terminal and transmitted through a preset message by a network side; or receiving information about the uplink waveform for information transmission of the terminal, the information about the uplink waveform being fed back to the terminal by the network side according to reporting information from the terminal.

19 Claims, 2 Drawing Sheets

(58) Field of Classification Search
CPC .......... H04L 5/02; H04L 27/32; H04W 92/10; H04W 24/00; H04W 24/10; H04W 52/00; H04B 7/204; H04B 1/66; H04B 1/68; H04J 9/00; H04J 2011/0003
See application file for complete search history.

(56) References Cited

U.S. PATENT DOCUMENTS

| | | | |
|---|---|---|---|
| 2011/0013617 A1 | 1/2011 | Ito | |
| 2011/0164532 A1 | 7/2011 | Kawamura et al. | |
| 2011/0205966 A1 | 8/2011 | Iwai et al. | |
| 2013/0051261 A1* | 2/2013 | Kazmi | H04W 52/0277 370/252 |
| 2013/0070703 A1 | 3/2013 | Yasukawa et al. | |
| 2015/0009883 A1 | 1/2015 | Bai et al. | |
| 2018/0116000 A1* | 4/2018 | Ly | H04W 74/0833 |
| 2018/0124710 A1* | 5/2018 | Ly | H04L 1/00 |
| 2018/0132264 A1* | 5/2018 | Jung | H04L 1/1812 |
| 2018/0242264 A1* | 8/2018 | Pelletier | H04W 52/346 |
| 2020/0036470 A1* | 1/2020 | Olesen | H04L 1/0025 |
| 2020/0037254 A1* | 1/2020 | Comsa | H04W 52/365 |

FOREIGN PATENT DOCUMENTS

| | | |
|---|---|---|
| EP | 2259632 A1 | 12/2010 |
| EP | 2259654 A1 | 12/2010 |
| EP | 2290890 A1 | 3/2011 |
| EP | 2557879 A1 | 2/2013 |
| JP | 2009246502 A | 10/2009 |
| JP | 2009542164 A | 11/2009 |
| JP | 2010508791 A | 11/2009 |
| JP | 2011223111 A | 11/2011 |
| WO | 2008003087 A2 | 1/2008 |
| WO | 2008057969 A2 | 5/2008 |
| WO | 2009118777 A1 | 10/2009 |
| WO | 2009153978 A1 | 12/2009 |
| WO | 2010067766 A1 | 6/2010 |

OTHER PUBLICATIONS

International Preliminary Report on Patentability of the International Search Authority for PCT/CN2017/109141 dated May 14, 2019 and its English translation provided by WIPO.
First office action European patent application 17869704.1 dated Oct. 2, 2019.
"Proposals on PHY related aspects in LTE Advanced" Agenda Time 6.2: 3GPP TSG RAN1#53, Kansas City, MO, USA, May 5-9, 2008.
"OFDM based Waveform for SG new radio interface" 3GPP TSG-RAN WG1 #84bis Busan, Korea, Apr. 11-15, 2016 R1-162889 Nokia, Alcatei-Lucent Shanghai Bell.
"Technical proposals and considerations for LTE advanced" REV-080007.
"5G Waveform & Multiple Access Techniques" Nov. 4, 2015 Qualcomm Technologies Inc.
Nokia et al., "OFDM Based Waveform for 5G New Radio Interface", 3GPP TSG-RAN WG1 #84bis, R1-162889, Apr. 1, 2016 (Apr. 1, 2016).
Nokia et al., "OFDM Based Waveform for 5G New Radio Interface", 3GPP TSG-RAN WG1 #85, R1-165011, May 13, 2016 (May 13, 2016).
International Search Report for PCT/CN2017/109141 dated Jan. 26, 2018 and its English translation provided by WIPO.
Written Opinion of the International Searching Authority for PCT/CN2017/109141 dated Jan. 26, 2018 and its English translation provided by WIPO.
Notice of Reasons for Refusal from JP app. No. 2019-523656, dated Sep. 8, 2020, with English translation from Global Dossier.
Communication pursuant to Article 94(3) EPC from EP app. No. 17869704.1, dated Jun. 30, 2021, all pages.
"Multiple access schemes for NR", R1-167615, 3GPP TSG RAN WG1 Meeting #86, Gothenburg, Sweden, Aug. 22-26, 2016, all pages.
"Discussion on DFT-s-OFDM and CP-OFDM for Uplink", R1-1609222, 3GPP TSG RAN WG1 Meeting #86bis, Lisbon, Portugal, Oct. 10-14, 2016, all pages.

* cited by examiner

UPLINK WAVEFORM ACQUISITION METHOD, UPLINK WAVEFORM FEEDBACK METHOD, TERMINAL AND BASE STATION

CROSS-REFERENCE TO RELATED APPLICATIONS

The application is the U.S. national phase application of a PCT Application No. PCT/CN2017/109141 filed on Nov. 2, 2017, which claims a priority to a Chinese patent application No. 201610981264.9 filed in China on Nov. 8, 2016, the disclosures of a which are incorporated herein by reference in their entireties.

TECHNICAL FIELD

The present disclosure relates to a field of communication technology, and specifically, relates to an uplink waveform acquisition method, an uplink waveform feedback method, a terminal and a base station.

BACKGROUND

In a relevant Long Term Evolution (LTE) system, Cyclic Prefix-Orthogonal Frequency Division Multiplexing (CP-OFDM) technique is used as downlink waveform, and Discrete Fourier Transform-Spread-Orthogonal Frequency Division Multiplexing (DFT-S-OFDM) technique is used as uplink waveform.

In a new radio (NR) technique in a Fifth Generation (5G) mobile communication system, uplink waveforms based on the CP-OFDM and the DFT-s-OFDM techniques are supported at least for enhanced Mobile BroadBand (eMBB) services in a frequency band below 40 GHz, wherein the DFT-s-OFDM is mainly used in a scene in which coverage is limited. A User Equipment (UE, for short) has to support both waveforms based on the CP-OFDM and the DFT-s-OFDM, and a network side device and the UE need to achieve a consensus about which of the waveforms is used.

SUMMARY

An uplink waveform acquisition method, an uplink waveform feedback method, a terminal, and a base station are provided in the present disclosure.

In a first aspect, some embodiments of the present disclosure provide the uplink waveform acquisition method. The method includes acquiring an uplink waveform to be used by a terminal for information transmission of the terminal; and performing information transmission according to the uplink waveform. The acquiring the uplink waveform to be used by the terminal for information transmission of the terminal, includes: determining the uplink waveform to be used by the terminal for current information transmission of the terminal, according to a correspondence between uplink waveforms and preset conditions predetermined in communication protocols; or receiving information about the uplink waveform determined for the terminal and to be used for information transmission of the terminal, the information about the uplink waveform being transmitted through a preset message by a network side; or receiving information about the uplink waveform to be used for the information transmission of the terminal, the information about the uplink waveform being fed back to the terminal by the network side according to reporting information reported by the terminal.

Further, the determining the uplink waveform to be used by the terminal for current information transmission of the terminal, according to the correspondence between uplink waveforms and preset conditions predetermined in communication protocols, includes: determining the uplink waveform to be used for information transmission of the terminal, according to a correspondence between uplink waveforms and frequency bands predetermined in communication protocols, and according to current operational frequency bands or frequencies of the terminal. The frequency bands include licensed frequency bands and unlicensed frequency bands; or the frequency bands includes frequency bands having frequencies larger than a first preset frequency and frequency bands having frequencies smaller than or equal to the first preset frequency according to frequency values; or the frequency bands include frequency bands having frequencies larger than or equal to a second preset frequency and frequency bands having frequencies smaller than the second preset frequency according to frequency values.

Further, the determining the uplink waveform to be used by the terminal for current information transmission of the terminal, according to the correspondence between uplink waveforms and preset conditions predetermined in communication protocols, includes: determining the uplink waveform to be used for information transmission of the terminal, according to a correspondence between service types of the terminal and uplink waveforms predetermined in communication protocols and according to a current service type of the terminal.

Further, the determining the uplink waveform to be used by the terminal for current information transmission of the terminal, according to the correspondence between uplink waveforms and preset conditions predetermined in communication protocols, includes: determining the uplink waveform to be used for information transmission of the terminal, according to a correspondence between link types and uplink waveforms predetermined in communication protocols and according to a current link type of the terminal.

Further, the preset message is a broadcast message or a dedicated message.

Further, the receiving information about the uplink waveform determined for the terminal and to be used for information transmission of the terminal, the information about the uplink waveform being transmitted through the preset message by the network side, includes: receiving information about the uplink waveform to be used for information transmission of the terminal, the information about the uplink waveform being transmitted by the network side through the preset message and determined according to frequency bands, service types of the terminal, link types, a size of radius of a cell or a coverage for the terminal.

Further, the receiving information about the uplink waveform to be used for the information transmission of the terminal, the information about the uplink waveform being fed back to the terminal by the network side according to reporting information reported by the terminal, includes: transmitting the reporting information to the network side, the reporting information including downlink measurement result information and/or uplink power information; receiving the information about the uplink waveform to be used for information transmission of the terminal, the information about the uplink waveform being determined by the network side according to the reporting information and fed back to the terminal.

Further, the transmitting the reporting information to the network side, includes: transmitting the reporting information to the network side in a random access procedure or after the random access procedure.

Further, the transmitting the reporting information to the network side, includes: obtaining a reference value of reference data used for generating the reporting information, wherein the reference data includes a pathloss, a downlink reference signal receiving power, a downlink reference signal receiving quality, a current transmission power level or an uplink power headroom; generating the reporting information according to the reference value; transmitting the reporting information to the network side. The reporting information includes the reference value or a difference between the reference value and a preconfigured threshold.

Further, in a case that the reference data includes the pathloss, the downlink reference signal receiving power or the downlink reference signal receiving quality, the generating the reporting information according to the reference value, includes: obtaining an uplink power offset of the terminal; generating the reporting information according to the uplink power offset and the reference value, wherein the reporting information includes a difference between the reference value and the uplink power offset; or a difference between the difference between the reference value and the uplink power offset and a preconfigured threshold.

Further, the obtaining the uplink power offset of the terminal, includes: obtaining the uplink power offset of the terminal according to a transmission power level of the terminal and a transmission power threshold preconfigured by the network side.

Further, in a case that the reporting information includes a difference between the reference value and a preconfigured threshold, before generating the reporting information according to the reference value, the uplink waveform acquisition method further includes: receiving the preconfigured threshold transmitted by the network side.

Further, in a case that the reporting information includes a difference between the reference value and a preconfigured threshold, the transmitting the reporting information to the network side, includes: transmitting the difference between the reference value and the preconfigured threshold to the network side, in a case that the difference between the reference value and the preconfigured threshold is smaller than a first preset threshold or smaller than or equal to the first preset threshold, or in a case that the difference between the reference value and the preconfigured threshold is larger than a second preset threshold or larger than or equal to the second preset threshold.

Further, in a case that the reference data includes the pathloss or the current transmission power level, the receiving the information about the uplink waveform to be used for information transmission of the terminal, the information about the uplink waveform being determined by the network side according to the reporting information and fed back to the terminal, includes: receiving information about the uplink waveform to be used for information transmission of the terminal, the information about the uplink waveform being a Cyclic Prefix-Orthogonal Frequency Division Multiplexing CP-OFDM and being determined by the network side under a condition that the reference value of the pathloss or the reference value of the current transmission power level is smaller than a first preset threshold or smaller than or equal to the first preset threshold; or receiving information about the uplink waveform to be used for information transmission of the terminal, the information about the uplink waveform being a Discrete Fourier Transform-Spread-Orthogonal Frequency Division Multiplexing DFT-s-OFDM and being determined by the network side under a condition that the reference value of the pathloss or the reference value of the current transmission power level is larger than the first preset threshold or larger than or equal to the first preset threshold.

Further, in a case that the reference data includes the downlink reference signal receiving power, the downlink reference signal receiving quality or the uplink power headroom, the receiving the information about the uplink waveform to be used for information transmission of the terminal, the information about the uplink waveform being determined by the network side according to the reporting information and fed back to the terminal, includes: receiving the information about the uplink waveform to be used for information transmission of the terminal, the information about the uplink waveform being a Discrete Fourier Transform-Spread-Orthogonal Frequency Division Multiplexing DFT-s-OFDM and being determined by the network side under a condition that a reference value of the downlink reference signal receiving power, a reference value of the downlink reference signal receiving quality or a reference value of the uplink power headroom is smaller than a second preset threshold or smaller than or equal to the second preset threshold; or receiving the information about the uplink waveform to be used for information transmission of the terminal, the information about the uplink waveform being a Cyclic Prefix-Orthogonal Frequency Division Multiplexing CP-OFDM and being determined by the network side under a condition that the reference value of the downlink reference signal receiving power, the reference value of the downlink reference signal receiving quality or the reference value of the uplink power headroom is larger than the second preset threshold or larger than or equal to the second preset threshold.

Further, the uplink waveform acquisition method further includes: receiving a power backoff value transmitted by the network side, wherein the power backoff value is used by the terminal to adjust a transmission power when the uplink waveform of the terminal is switched between a Cyclic Prefix-Orthogonal Frequency Division Multiplexing CP-OFDM and a Discrete Fourier Transform-Spread-Orthogonal Frequency Division Multiplexing DFT-s-OFDM.

In a second aspect, some embodiments of the present disclosure provide the terminal. The terminal includes an acquisition module, configured for acquiring information about an uplink waveform to be used by the terminal for information transmission of the terminal; and a transmission module, configured for performing information transmission according to the uplink waveform, wherein, the acquisition module includes: a first determination submodule, configured for determining an uplink waveform to be used by the terminal for current information transmission of the terminal, according to a correspondence between uplink waveforms and preset conditions predetermined in communication protocols; or a first reception submodule, configured for receiving the information about the uplink waveform to be used for information transmission of the terminal, the information about the uplink waveform being determined for the terminal and being transmitted through a preset message by the network side; or a second reception submodule, configured for receiving the information about the uplink waveform to be used for information transmission of the terminal, the information about the uplink waveform being fed back to the terminal by the network side according to reporting information transmitted from the terminal.

Further, the first determination submodule is configured for: determining the uplink waveform to be used for information transmission, according to a correspondence between uplink waveforms and frequency bands predetermined in communication protocols and according to current operational frequency bands or frequencies of the terminal; wherein the frequency bands include licensed frequency bands and unlicensed frequency bands; or the frequency bands include frequency bands having frequencies larger than a first preset frequency and frequency bands having frequencies smaller than or equal to the first preset frequency according to frequency values; or the frequency bands include frequency bands having frequencies larger than or equal to a second preset frequency and frequency bands having frequencies smaller than the second preset frequency according to frequency values.

Further, the first determination submodule is configured for: determining the uplink waveform to be used for information transmission according to a correspondence between service types of a terminal and uplink waveforms predetermined in communication protocols and according to a current service type of the terminal.

Further, the first determination submodule is configured for: determining an uplink waveform to be used for information transmission according to a correspondence between link types and uplink waveforms predetermined in communication protocols and according to a current link type of the terminal.

Further, the preset message is a broadcast message or a dedicated message.

Further, the first reception submodule is configured for: receiving the information about the uplink waveform to be used for the information transmission of the terminal, the information about the uplink waveform being determined by the network side according to frequency bands, service types of a terminal, link types, a size of a radius of a cell or a coverage for the terminal, and being transmitted to the terminal through a preset message.

Further, the second reception submodule includes: a first transmission unit configured for transmitting reporting information to the network side, wherein the reporting information includes downlink measurement result information and/or uplink power information; and a first reception unit configured for receiving the information about the uplink waveform to be used for the information transmission of the terminal, the information about the uplink waveform being determined by the network side according to the reporting information and fed back to the terminal.

Further, the first transmission unit is configured for: transmitting the reporting information to the network side within a random access procedure or after the random access procedure.

Further, the first transmission unit includes: an obtaining subunit configured for obtaining a reference value of reference data used for generating the reporting information, wherein the reference data includes a pathloss, a downlink reference signal receiving power, a downlink reference signal receiving quality, a current transmission power level or an uplink power headroom; a generation subunit configured for generating the reporting information according to the reference value; and a transmission subunit configured for transmitting the reporting information to the network side, wherein, the reporting information includes the reference value or a difference between the reference value and a preconfigured threshold.

Further, in a case that the reference data includes the pathloss, the downlink reference signal receiving power or the downlink reference signal receiving quality, the generation subunit is configured for: obtaining an uplink power offset of the terminal; and generating the reporting information according to the uplink power offset and the reference value. The reporting information includes a difference between a reference value and the uplink power offset; or a difference between the difference between the reference value and the uplink power offset and a preconfigured threshold.

Further, a manner in which the uplink power offset of the terminal is obtained is: obtaining the uplink power offset of the terminal according to a transmission power level of the terminal and a transmission power threshold preconfigured by the network side.

Further, in a case that the reporting information includes the difference between the reference value and the preconfigured threshold, the terminal further includes: a first reception module configured for receiving the preconfigured threshold transmitted by the network side.

Further, in a case that the reporting information includes the difference between the reference value and the preconfigured threshold, the transmission subunit is configured for: transmitting the difference between the reference value and the preconfigured threshold to the network side in a case that the difference between the reference value and the preconfigured threshold is smaller than a first preset threshold or smaller than or equal to the first preset threshold, or in a case that the difference between the reference value and the preconfigured threshold is larger than a second preset threshold or larger than or equal to the second preset threshold.

Further, in a case that the reference data includes the pathloss or the current transmission power level, the first reception unit is configured for: receiving the information about the uplink waveform to be used for information transmission of the terminal, the information about the uplink waveform being a Cyclic Prefix-Orthogonal Frequency Division Multiplexing, CP-OFDM, and being determined by the network side under a condition that the pathloss or the reference value of the current transmission power level is smaller than a first preset threshold or smaller than or equal to the first preset threshold; or receiving the information about the uplink waveform to be used for information transmission of the terminal, the information about the uplink waveform being a Discrete Fourier Transform-Spread-Orthogonal Frequency Division Multiplexing, DFT-s-OFDM, and being determined by the network side under a condition that the pathloss or the reference value of the current transmission power level is larger than the first preset threshold or larger than or equal to the first preset threshold.

Further, in a case that the reference data includes the downlink reference signal receiving power, the downlink reference signal receiving quality or the uplink power headroom, the first reception unit is configured for: receiving the information about the uplink waveform to be used for information transmission of the terminal, the information about the uplink waveform being a Discrete Fourier Transform-Spread-Orthogonal Frequency Division Multiplexing, DFT-s-OFDM, and being determined by the network side under a condition that a reference value of the downlink reference signal receiving power, a reference value of the downlink reference signal receiving quality or a reference value of the uplink power headroom is smaller than a second preset threshold or smaller than or equal to the second preset threshold; or receiving the information about the uplink waveform to be used for information transmission of the terminal, the information about the uplink waveform being a Cyclic Prefix-Orthogonal Frequency Division Multiplexing, CP-OFDM, and being determined by the network side under a condition that the reference value of the downlink reference signal receiving power, the reference value of the downlink reference signal receiving quality or the reference value of the uplink power headroom is larger than the second preset threshold or larger than or equal to the second preset threshold.

Further, the terminal further includes a second reception module configured for receiving a power backoff value transmitted by the network side, wherein the power backoff value is used by the terminal to adjust a transmission power when the uplink waveform of the terminal is switched between a Cyclic Prefix-Orthogonal Frequency Division Multiplexing, CP-OFDM, and a Discrete Fourier Transform-Spread-Orthogonal Frequency Division Multiplexing, DFT-s-OFDM.

In a third aspect, some embodiments of the present disclosure provide an uplink waveform feedback method. The method includes determining an uplink waveform to be used by a terminal for information transmission of the terminal. The determining the uplink waveform to be used by the terminal for information transmission of the terminal, includes: determining, according to a correspondence between uplink waveforms and preset conditions predetermined in communication protocols, the uplink waveform to be used by the terminal for current information transmission of the terminal; or determining the uplink waveform to be used by the terminal for information transmission of the terminal, according to frequency bands, service types of a terminal, link services, a size of a radius of a cell or a coverage for the terminal; or determining the uplink waveform to be used by the terminal for information transmission of the terminal according to reporting information transmitted by the terminal.

Further, wherein, the determining, according to a correspondence between uplink waveforms and preset conditions predetermined in communication protocols, the uplink waveform to be used by the terminal for current information transmission of the terminal, includes: determining the uplink waveform to be used for information transmission of the terminal, according to a correspondence between uplink waveforms and frequency bands predetermined in communication protocols and according to current operational frequency bands or frequencies of the terminal. The frequency bands include licensed frequency bands and unlicensed frequency bands; or the frequency bands include frequency bands having frequencies larger than a first preset frequency and frequency bands having frequencies smaller than or equal to the first preset frequency according to frequency values; or the frequency bands includes frequency bands having frequencies larger than or equal to a second present frequency and frequency bands having frequencies smaller than the second preset frequency according to frequency values.

Further, the determining, according to a correspondence between uplink waveforms and preset conditions predetermined in communication protocols, the uplink waveform to be used by the terminal for current information transmission of the terminal, includes: determining the uplink waveform to be used for information transmission, according to a correspondence between service types of a terminal and uplink waveforms predetermined in communication protocols and according to a current service type of the terminal.

Further, the determining, according to a correspondence between uplink waveforms and preset conditions predetermined in communication protocols, the uplink waveform to be used by the terminal for current information transmission of the terminal, includes: determining the uplink waveform to be used for information transmission according to a correspondence between link types and uplink waveforms predetermined in communication protocols and according to a current link type of the terminal.

Further, after the determining the uplink waveform to be used by the terminal for information transmission of the terminal, according to frequency bands, service types of a terminal, link services, a size of a radius of a cell or a coverage for the terminal, the uplink waveform feedback method further includes: transmitting the information about the uplink waveform to the terminal through a preset message.

Further, the preset message is a broadcast message or a dedicated message.

Further, the determining the uplink waveform to be used by the terminal for information transmission of the terminal according to reporting information transmitted by the terminal, includes: receiving the reporting information transmitted by the terminal, the reporting information including downlink measurement result information and/or uplink power information; and determining the uplink waveform to be used for information transmission of the terminal, according to the reporting information.

Further, the receiving the reporting information transmitted by the terminal, includes: receiving the reporting information transmitted by the terminal in a random access procedure or after the random access procedure.

Further, the receiving the reporting information transmitted by the terminal, includes: receiving the reporting information generated by the terminal according to a reference value of reference data, wherein the reference data includes a pathloss, a downlink reference signal receiving power, a downlink reference signal receiving quality, a current transmission power level or an uplink power headroom; the reporting information includes a reference value or a difference between the reference value and a preconfigured threshold.

Further, in a case that the reference data includes the pathloss, the downlink reference signal receiving power or the downlink reference signal receiving quality, the receiving the reporting information generated by the terminal according to the reference value of the reference data, includes: receiving the reporting information generated by the terminal according to an uplink power offset and the reference value of the reference data, wherein the reporting information includes a difference between the reference value and the uplink power offset, or a difference between the difference between the reference value and the uplink power offset and a preconfigured threshold.

Further, in a case that the reporting information includes the difference between the reference value and the preconfigured threshold, and before the receiving the reporting information generated by the terminal according to the reference value of the reference data, the uplink waveform feedback method further includes: transmitting the preconfigured threshold to the terminal.

Further, in a case that the reporting information includes the difference between the reference value and the preconfigured threshold, and before receiving the reporting information generated by the terminal, the uplink waveform feedback method further includes: transmitting to the terminal a preset rule under which the terminal feeds back the reporting information, wherein the preset rule is that the terminal transmits the reporting information under a condition that the difference between the reference value and the preconfigured threshold is smaller than a first preset threshold or smaller than or equal to the first preset threshold, or under a condition that the difference between the reference value and the preconfigured threshold is larger than a second preset threshold or larger than or equal to the second preset threshold.

Further, in a case that the reference data includes the pathloss or the current transmission power level, the determining the uplink waveform to be used by the terminal for information transmission of the terminal according to reporting information transmitted by the terminal, includes: determining the uplink waveform used for information transmission of the terminal, to be a Cyclic Prefix-Orthogonal Frequency Division Multiplexing (CP-OFDM), under a condition that the pathloss or the reference value of the current transmission power level is smaller than a first preset threshold or smaller than or equal to the first preset threshold; and determining the uplink waveform used for information transmission of the terminal, to be a Discrete Fourier Transform-Spread-Orthogonal Frequency Division Multiplexing (DFT-s-OFDM), under a condition that the pathloss or the reference value of the current transmission power level is larger than the first preset threshold or larger than or equal to the first preset threshold.

Further, in a case that the reference data includes the downlink reference signal receiving power, the downlink reference signal receiving quality or the uplink power headroom, the determining the uplink waveform to be used by the terminal for information transmission of the terminal according to reporting information transmitted by the terminal includes: determining the uplink waveform to be used for information transmission of the terminal, to be a Discrete Fourier Transform-Spread-Orthogonal Frequency Division Multiplexing (DFT-s-OFDM), under a condition that the reference value of the downlink reference signal receiving power, the reference value of the downlink reference signal receiving quality or the reference value of the uplink power headroom is smaller than a second preset threshold or smaller than or equal to the second preset threshold; and determining the uplink waveform used for information transmission of the terminal, to be a Cyclic Prefix-Orthogonal Frequency Division Multiplexing (CP-OFDM), under a condition that the reference value of the downlink reference signal receiving power, the reference value of the downlink reference signal receiving quality or the reference value of the uplink power headroom is larger than the second preset threshold or larger than or equal to the second preset threshold.

Further, the uplink waveform feedback method further includes transmitting a power backoff value to the terminal, wherein the power backoff value is used by the terminal to adjust a transmission power when the uplink waveform of the terminal is switched between a Cyclic Prefix-Orthogonal Frequency Division Multiplexing (CP-OFDM) and a Discrete Fourier Transform-Spread-Orthogonal Frequency Division Multiplexing (DFT-s-OFDM).

In a fourth aspect, some embodiments of the present disclosure further provide a base station. The base station includes a determination module, configured for determining an uplink waveform to be used by the terminal for information transmission of the terminal. The determination module includes: a second determination submodule configured for determining an uplink waveform to be used for current information transmission of the terminal, according to a correspondence between uplink waveforms and preset conditions predetermined in communication protocols; or a third determination submodule configured for determining the uplink waveform to be used for information transmission of the terminal, according to frequency bands, service types of a terminal, link services, a size of a radius of a cell or a coverage for the terminal; or a fourth determination submodule configured for determining the uplink waveform to be used for information transmission of the terminal according to reporting information transmitted by the terminal.

Further, the second determination submodule is configured for: determining the uplink waveform to be used for information transmission, according to a correspondence between uplink waveforms and frequency bands predetermined in communication protocols and according to current operational frequency bands or frequencies of the terminal. The frequency bands include licensed frequency bands and unlicensed frequency bands; or the frequency bands include frequency bands having frequencies larger than a first preset frequency and frequency bands having frequencies smaller than or equal to the first preset frequency according to frequency values; or the frequency bands include frequency bands having frequencies larger than or equal to a second preset frequency and frequency bands having frequencies smaller than the second preset frequency according to frequency values.

Further, the second determination submodule is configured for: determining the uplink waveform to be used for information transmission, according to a correspondence between service types of a terminal and uplink waveforms predetermined in communication protocols and according to a current service type of the terminal.

Further, the second determination submodule is configured for: determining the uplink waveform to be used for information transmission, according to a correspondence between link types and uplink waveforms predetermined in communication protocols and according to a current link type of the terminal.'

Further, in a case that the determination module includes the third determination submodule, the base station further includes: an announcing module configured for announcing the information about the uplink waveform to the terminal through a preset message.

Further, the preset message is a broadcast message or a dedicated message.

Further, the fourth determination submodule includes: a second reception unit configured for receiving the reporting information transmitted by the second reception unit, the reporting information including downlink measurement result information and/or uplink power information; and a determination unit configured for determining, according to the reporting information, the uplink waveform to be used for information transmission of the terminal.

Further, the second reception unit is used for receiving the reporting information transmitted by the terminal in a random access procedure or after the random access procedure.

Further, the second reception unit is configured for receiving the reporting information generated by the terminal according to a reference value of reference data, wherein the reference data includes a pathloss, a downlink reference signal receiving power, a downlink reference signal receiving quality, a current transmission power level or an uplink power headroom; the reporting information includes a reference value or a difference between the reference value and a preconfigured threshold.

Further, in a case that the reference data includes the pathloss, the downlink reference signal receiving power or the downlink reference signal receiving quality, the second reception unit is configured for: receiving the reporting information generated by the terminal according to an uplink power offset and the reference value of the reference data. The reporting information includes a difference between the reference value and the uplink power offset, or a difference between the difference between the reference value and the uplink power offset and the preconfigured threshold.

Further, in a case that the reporting information includes the difference between the reference value and the preconfigured threshold, the base station further includes: a first transmission module configured for transmitting the preconfigured threshold to the terminal.

Further, in a case that the reporting information includes the difference between the reference value and the preconfigured threshold, the base station further includes: a second transmission module configured for transmitting to the terminal a preset rule under which the terminal feeds back the reporting information, wherein the preset rule is that the terminal transmits the reporting information under a condition that the difference between the reference value and the preconfigured threshold is smaller than a first preset threshold or smaller than or equal to the first preset threshold, or under a condition that the difference between the reference value and the preconfigured threshold is larger than a second preset threshold or larger than or equal to the second preset threshold.

Further, in a case that the reference data includes the pathloss or the current transmission power level, the determination unit is configured for: determining the uplink waveform used for information transmission of the terminal, to be a Cyclic Prefix-Orthogonal Frequency Division Multiplexing (CP-OFDM), under a condition that the pathloss or the reference value of the current transmission power level is smaller than a first preset threshold or smaller than or equal to the first preset threshold; or determining the uplink waveform used for information transmission of the terminal, to be a Discrete Fourier Transform-Spread-Orthogonal Frequency Division Multiplexing (DFT-s-OFDM), under a condition that the pathloss or the reference value of the current transmission power level is larger than the first preset threshold or larger than or equal to the first preset threshold.

Further, in a case that the reference data includes the downlink reference signal receiving power, the downlink reference signal receiving quality or the uplink power headroom, the determination unit is configured for: determining the uplink waveform used for information transmission of the terminal to be a Discrete Fourier Transform-Spread-Orthogonal Frequency Division Multiplexing (DFT-s-OFDM), under a condition that a reference value of the downlink reference signal receiving power, a reference value of the downlink reference signal receiving quality or a reference value of the uplink power headroom is smaller than a second preset threshold or smaller than or equal to the second preset threshold; or determining the uplink waveform used for information transmission of the terminal to be a Cyclic Prefix-Orthogonal Frequency Division Multiplexing (CP-OFDM), under a condition that the reference value of the downlink reference signal receiving power, the reference value of the downlink reference signal receiving quality or the reference value of the uplink power headroom is larger than the second preset threshold or larger than or equal to the second preset threshold.

Further, the base station further includes a third transmission module configured for transmitting a power backoff value to the terminal, wherein the power backoff value is used by the terminal to adjust a transmission power when the uplink waveform of the terminal is switched between a Cyclic Prefix-Orthogonal Frequency Division Multiplexing (CP-OFDM) and a Discrete Fourier Transform-Spread-Orthogonal Frequency Division Multiplexing (DFT-s-OFDM).

In a fifth aspect, some embodiments of the present disclosure provide a terminal. The terminal includes a processor; a storage, connected to the processor through a bus interface and configured for storing programs and data used in a process of performing operations by the processor; wherein, in a case that the processor invokes and executes the programs and the data stored in the storage, the processor performs the method according to the first aspect.

In a sixth aspect, some embodiments of the present disclosure provide a base station. The base station includes a processor; a storage, connected to the processor through a bus interface and configured for storing programs and data used in a process of performing operations by the processor; wherein, in a case that the processor invokes and executes the programs and the data stored in the storage, the processor performs the method according to the third aspect.

In a seventh aspect, some embodiments of the present disclosure provide a non-volatile storage medium. The medium includes programs and data stored on the non-volatile storage medium, wherein in a case that the programs and the data are executed by a processor, the processor implements the method according to the first aspect.

In an eighth aspect, some embodiments of the present disclosure provide a non-volatile storage medium. The medium includes programs and data stored on the non-volatile storage medium, wherein in a case that the programs and the data are executed by a processor, the processor implements the method according to the third aspect.

DETAILED DESCRIPTION

In order to make technical purposes, technical solutions, and advantages of the present disclosure clearer, specific embodiments will be described hereinafter in detail in combination with accompanying drawings of the present disclosure.

A determined solution is not provided in a NR (New Radio) of a relevant fifth generation (5G) mobile communication system to determine an uplink waveform of a terminal and inform the terminal of the uplink waveform, causing a network communication procedure incomplete and affecting the network communication procedure. An uplink waveform acquisition method, an uplink waveform feedback method, a terminal and a base station are provided in the present disclosure.

Figure 1:
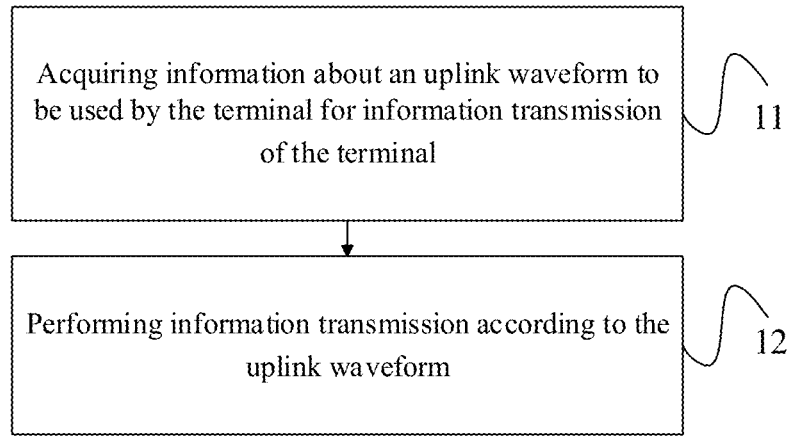
FIG. 1 is a flowchart of an uplink waveform acquisition method according to some embodiments of the present disclosure.

FIG. 1 is a flowchart of an uplink waveform acquisition method according to some embodiments of the present disclosure. The uplink waveform acquisition method provided in the present disclosure and shown in FIG. 1 is applied to a terminal side (i.e. a User Equipment (UE) side) and includes steps 11 and 12.

Step 11: acquiring information about an uplink waveform to be used by the terminal for information transmission of the terminal.

It should be noted that the uplink waveform acquisition method is applied in the NR of the 5G communication system, and the NR of the 5G communication system supports both a Cyclic Prefix-Orthogonal Frequency Division Multiplexing (CP-OFDM) technique and a Discrete Fourier Transform-Spread-Orthogonal Frequency Division Multiplexing (DFT-s-OFDM) technique. Thus, the uplink waveforms in the embodiments include waveforms based on the CP-OFDM and the DFT-s-OFDM.

Step 12: performing information transmission according to the uplink waveform.

It should be noted that, when the terminal knows the uplink waveform through which information is to be transmitted by the terminal, the terminal may communicate with the network side according to the uplink waveform in a subsequent communication process.

It should be noted that the embodiments of the present disclosure are to make the uplink waveform used by a terminal side be consistent with uplink waveforms known by a network side, so as to ensure a reliable communication process.

It should be noted that, the network side in the embodiments of the present disclosure is an access-network side, such as a base station side.

Specifically, the step 11 may be implemented in ways as follow.

First way: determining the uplink waveform to be used by the terminal for current information transmission of the terminal, according to a correspondence between uplink waveforms and preset conditions predetermined in communication protocols.

It should be noted that the uplink waveform to be used by the terminal in the preset conditions is predetermined in the first way according to the communication protocols. Thus, the network side does not need to inform the uplink waveform, and the network side and the terminal side may acquire the uplink waveform according to agreements in the communication protocols. Specifically, the preset conditions may include frequency bands, service types of a terminal, or link types.

In a case that the preset conditions are frequency bands, the frequency bands may include licensed frequency bands and unlicensed frequency bands. For example, the communication protocols may specify an uplink waveform used in the unlicensed frequency bands is the CP-OFDM; and the uplink waveform used in the licensed frequency bands is the DFT-s-OFDM. The frequency bands may also include frequency bands higher than a first preset frequency and frequency bands lower than or equal to the first preset frequency according to frequency values; or the frequency bands may include frequency bands higher than or equal to a second preset frequency or frequency bands lower than the second present frequency. For example, the communication protocols may pre-specify uplink waveforms according to frequency values by taking a value of a specific frequency bin as a threshold. Specifically, for example, the communication protocols may specify an uplink waveform used in a case that a frequency is lower than or equal to 20 GHz is the DFT-s-OFDM, otherwise the uplink waveform used is the CP-OFDM. The terminal may determine an uplink waveform according to a frequency band to which a current operational carrier belongs and may perform a subsequent transmission procedure.

In a case that the preset conditions are service types of a terminal, the terminal may determine an uplink waveform to be used, according to a current service type of the terminal. For example, the communication protocols may specify an uplink waveform used for a massive Machine Type Communication (mMTC) is the DFT-s-OFDM and an uplink waveform used for an ultra Reliability Low Latency Communication (URLLC) is the CP-OFDM.

In a case that the preset conditions are link types, the terminal may determine, according to the link types, an uplink waveform to be used. For example, the communication protocols may specify an uplink waveform used for a sidelink is the CP-OFDM, and an uplink waveform used for an uplink is the DFT-s-OFDM. The terminal may determine, according to a link type of a current link, an uplink waveform to be used.

Second way: receiving information about an uplink waveform to be used for information transmission of the terminal, the information about the uplink waveform being determined for the terminal and transmitted through a preset message by the network side.

It should be noted that, the preset message may be a broadcast message or a dedicated message. The dedicated message may be physical-layer control information or a high-layer dedicated signaling. For example, the high-layer dedicated signaling may be a Radio Resource Control (RRC) message.

Specifically, the terminal receives the information about the uplink waveform to be used for the information transmission of the terminal, wherein the information about the uplink waveform is determined by the network side according to the frequency bands, the service types of the terminal, the link types, a radius of a cell or a coverage for the terminal and is transmitted to the terminal through the preset message.

For example, in a case that the preset message is the broadcast message, the network side may determine, according to a size of the radius of the cell, the uplink waveform to be used by the terminal, and inform the terminal in the cell through the broadcast message. For example, in a case that the radius of the cell is small (the size of the radius of the cell may be smaller than a preset value), the network side may inform the terminal in the cell to use the CP-OFDM as the uplink waveform through the broadcast message; otherwise, the network side may inform the terminal in the cell to use the DFT-s-OFDM as the uplink waveform through the broadcast message.

For example, in a case that the preset message is the dedicated message, the network side may determine, according to coverage for the terminal, the uplink waveform to be used by the terminal, and inform the terminal in the cell through the dedicated message. For example, in a Non-Stand Alone (NSA) deployment in the New Radio (NR), an anchor cell still uses a Long Term Evolution (LTE) technique, and non-anchor cells use the NR. The network side may determine, according to coverage for the terminal obtained from the anchor cell, an uplink waveform to be used for operation of the terminal in the NR non-anchor cells, and then inform the terminal through the dedicated message.

Third way: receiving information about the uplink waveform to be used for information transmission of the terminal by the terminal, the information about the uplink waveform being fed back to the terminal by the network side according to reporting information transmitted from the terminal.

It should be noted that, the reporting information mainly includes downlink measurement result information and/or uplink power information. Main steps in the third way include steps 1-3.

Step 1: obtaining a reference value of reference data used for generating the reporting information by the terminal, wherein the reference data includes a pathloss, a downlink reference signal receiving power, a downlink reference signal receiving quality, a current transmission power level or an uplink power headroom;

Step 2: generating the reporting information according to the reference value;

Step 3: transmitting the reporting information to the network side, wherein, the reporting information includes the reference value or a difference between the reference value and a preconfigured threshold.

It should be noted that downlink measurement result information includes a reference value of the pathloss or a difference between the reference value and a preconfigured threshold; a reference value of the downlink reference signal receiving power or a difference between the reference value and a preconfigured threshold; and a reference value of the downlink reference signal receiving quality or a difference between the reference value and a present threshold. Uplink power information includes a reference value of a current transmission power level or a difference between the reference value and a preconfigured threshold, and a reference value of an uplink power headroom or a difference between the reference value and a preconfigured threshold.

Optionally, in a case that the reference data includes the pathloss, the downlink reference signal receiving power or the downlink reference signal receiving quality, a specific implementation of the step 2 includes: obtaining an uplink power offset of the terminal; and generating the reporting information according to the uplink power offset and the reference value, wherein the reporting information includes a difference between the reference value and the uplink power offset; or a difference between the difference between the reference value and the uplink power offset and a preconfigured threshold.

In the embodiments, a manner in which the uplink power offset of the terminal is obtained is: obtaining the uplink power offset of the terminal according to a transmission power level of the terminal and a transmission power threshold preconfigured by the network side.

It should be noted that, the transmission power threshold preconfigured by the network side is preconfigured and is announced to the terminal by the network side.

Taking a case in which the reference data for generating the reporting information is the pathloss (i.e., a downlink measurement parameter is the pathloss) as an example, the terminal measures the pathloss and obtains a measurement result $L_{meas}$ of the pathloss, and the terminal reports the measurement result of the pathloss or a difference between the measurement result of the pathloss and a threshold preconfigured by the network side (such as by a base station).

It should be noted that, in a case that the terminal reports to the network side the difference between the measurement result of the pathloss and the threshold preconfigured by the base station, the base station may notify in advance the terminal of the threshold $L_{threshold}$ preconfigured by the network side, and the terminal obtains the difference S1 between the measurement result of the pathloss and the threshold preconfigured by the network according to a formula $S1=L_{meas}-L_{threshold}$ and report the difference S1 to the base station. Specifically, the terminal reports to the base station the difference between a quantified measurement result of the pathloss and the threshold preconfigured by the base station, or the terminal reports to the base station whether the S1 is smaller than 0 (or smaller than or equal to 0). Further, the base station may also set or preconfigure the terminal with a preset rule of reporting the difference to the base station. The preset rule requires the terminal to transmit the reporting information to the network side in a case that the difference between the reference value and a preconfigured threshold is smaller than a first preset threshold or smaller than or equal to the first preset threshold or the difference between the reference value and a preconfigured threshold is larger than a second preset threshold or smaller than or equal to the second preset threshold. The terminal receives the preset rule and transmits the reporting information in a case that the preset rule is met. For example, the terminal may be preconfigured to report the difference between the quantified measurement report of the pathloss and the threshold preconfigured by the network side when the S1 is smaller than (or smaller than or equal to) a threshold; or the terminal is preconfigured to report one bit when the S1 is smaller than 0 (or smaller than or equal to 0).

Taking as an example a case in which the reference data used for generating the reporting information is the downlink reference signal receiving power (i.e., the downlink measurement parameter is the downlink reference signal receiving power), the terminal measures the downlink reference signal receiving power $P_{rx,meas}^{DL}$, and reports the downlink reference signal receiving power to the base station or reports the difference between the downlink reference signal receiving power and a threshold preconfigured by the base station.

Specifically, in a case that the terminal reports to the base station the difference between the downlink reference signal receiving power and the threshold preconfigured by the base station, the base station notifies the terminal of a minimum downlink receiving power $P_{rx,min}^{DL}$, a maximum transmission power $P_{POWERCLASS,0}$ allowable in a cell, and a power offset $P_{offset}^{UL}$.

A difference S2 is calculated by the terminal based on a measured downlink reference signal receiving power according to a following formula $S2=P_{rx,meas}^{DL}-P_{rx,min}^{DL}-(P_{UE\_MAX}-P_{POWERCLASS,0})-P_{offset}^{UL}$, wherein $P_{UE\_MAX}$ is a transmission power level of the terminal. Optionally, the minimum downlink receiving power $P_{rx,min}^{DL}$ is determined by the base station side according to a maximum pathloss of a cell or a maximum coupling loss, and the power offset $P_{offset}^{UL}$ is determined by judging whether the CP-OFDM may increase an uplink speed or not. Specifically, the terminal reports to the base station a quantified value of the S2, or the terminal reports to the base station whether the S2 is smaller than 0 (or smaller than or equal to 0). Further, the base station may also set or preconfigure the terminal with a preset rule of reporting the difference. The preset rule requires the terminal to transmit the reporting information to the network side in a case that the difference between the reference value and the preconfigured threshold is smaller than the first preset threshold or smaller than or equal to (a mathematical symbol "≤") the first preset threshold or the difference between the reference value and the preconfigured threshold is larger than a second preset threshold or larger than or equal to (a mathematical symbol "≥") the second preset threshold. The terminal receives the preset rule and transmits the reporting information in a case that the preset rule is met. For example, the terminal may be preconfigured to report the quantified value of the S2 when the S2 is smaller than (or smaller than or equal to) a threshold;

or the terminal is preconfigured to report one bit when the S2 is smaller than 0 (or smaller than or equal to 0).

It should be noted that, a case in which the reference data is the downlink reference signal receiving quality is similar to the case in which the reference data is the downlink reference signal receiving power, and details of the former case is not provided herein.

Taking as an example a case in which the reference data for generating the reporting information is the current transmission power level of the terminal, the terminal determines a current transmission power level, the current transmission power level may be an instant transmission power, a transmission power for a specific message in a specific process, or an average transmission power within a specific time period. The terminal reports a quantified transmission power level, or the terminal reports a difference between the transmission power and a transmission power preconfigured by the base station side, or the terminal reports whether a maximum transmission power is reached. Further, the terminal may be set or preconfigured with a reporting condition under which the terminal triggers the reporting to the base station side. For example, the terminal may be preconfigured to trigger the reporting to the base station, under a condition that the transmission power level of the terminal is lower than a specific threshold; or the terminal may be set to trigger the reporting to the base station, under a condition that a maximum transmission power of the terminal is not reached.

Taking as an example a case in which the reference data for generating the reporting information is the uplink power headroom, the terminal determines the uplink power headroom, and reports the uplink power headroom to the network side. Specifically, for example, a reference bandwidth is arranged at the base station side. The terminal calculates a difference between a maximum transmission power and a transmission power needed for transmission within the reference bandwidth and take the difference as the uplink power headroom for reporting.

The base station side determines the uplink waveform of the terminal according to the reporting information of the terminal. Optionally, in a case that the pathloss is smaller than a threshold or smaller than or equal to the threshold, the uplink waveform of the terminal is configured to be the CP-OFDM, otherwise, the uplink waveform of the terminal is configured to be the DFT-s-OFDM. In a case that the downlink reference signal receiving power or the downlink reference signal receiving quality is smaller than a threshold or smaller than or equal to the threshold, the uplink waveform of the terminal is configured to be the DFT-s-OFDM, otherwise, the uplink waveform of the terminal is configured to be the CP-OFDM. In a case that the current transmission power level of the terminal is smaller than a threshold or smaller than or equal to the threshold, the uplink waveform of the terminal is configured to be the CP-OFDM, otherwise, the uplink waveform of the terminal is configured to be the DFT-s-OFDM. In a case that the uplink power headroom is smaller than a threshold or smaller than or equal to the threshold, the uplink waveform of the terminal is configured to be the DFT-s-OFDM, otherwise, the uplink waveform of the terminal is configured to be the CP-OFDM.

It should be further noted that, the terminal may transmit the reporting information to the network side in a random access procedure or after the random access procedure. Accordingly, after the network side receives the reporting information, the network side transmits information about a determined uplink waveform to the terminal within the random access procedure or after the random access procedure.

For example, the terminal reports a downlink measurement result or the uplink power information to the base station side through a preamble in a first message, Message 1 (Msg1), in a random access procedure. The base station side configures the information about the uplink waveform in a response message to the Msg1. The terminal determines the uplink waveform according to configuration in a response message to the Msg1 until the terminal receives an uplink waveform reconfiguration. Specifically, the terminal informs the network side explicitly through the Msg1 or informs the network side implicitly through random access resources. For example, the random access resources are divided in advance to correspond to different downlink measurement reports or uplink power information. Specifically, taking the pathloss as the example, the random access resources are divided into two portions in advance. One of the two portions corresponds to a condition in which a pathloss measurement result is larger than a preconfigured threshold, and the other of the two portions corresponds to a condition in which the pathloss measurement result is not larger than the preconfigured threshold.

For example, the terminal reports the downlink measurement result or the uplink power information to the base station side through a third message, Message 3 (Msg3), in the random access procedure. The base station side configures an uplink waveform for the terminal through a dedicated signaling. The terminal determines the uplink waveform according to configuration in the dedicated signaling before the terminal receives an uplink waveform reconfiguration signaling. The Message 3 (Msg3) is transmitted by using a predefined uplink waveform. For example, the communication protocols specify an uplink waveform used for the Msg3 is the DFT-s-OFDM.

For example, the terminal reports the downlink measurement result or the uplink power information to the base station side within an uplink transmission process subsequent to the random access procedure. The network side configures the uplink waveform through a dedicated signaling. The terminal determines the uplink waveform according to configuration in the dedicated signaling before the terminal receives an uplink waveform reconfiguration signaling. The terminal uses a predefined uplink waveform for transmission before the terminal obtains configuration of uplink waveforms configured by the network side. For example, the communication protocols specify an uplink waveform used for the Msg3 is the DFT-s-OFDM.

It should be noted that, in actual applications, the above conditions/cases may be combined so as to achieve a purpose that the terminal uses the uplink waveforms for information transmission.

One implementation in actual applications: the base station side announces uplink waveforms to be used in a cell through a broadcast message. Further, the terminal reports the uplink power information, and the base station side determines an uplink waveforms based on the reporting information from the terminal, and informs the terminal of the determined uplink waveform.

For example, the base station side informs terminals in the cell, through the broadcast message, that an uplink waveform of DFT-s-OFDM is used for the terminals in the cell. Further, the terminal determines the uplink power information and reports the uplink power information to the base station side. The base station side determines the uplink waveform for the terminals and informs the terminals of the determined uplink waveform. It should be noted that, before the terminal obtains the uplink waveform configured by the network side, the uplink waveform used by the terminal is the DFT-s-OFDM; after the terminal obtains a configuration of an uplink waveform configured by the network side, the terminal transmits information according to the uplink waveform configured by the base station side according to the uplink power information.

It should be further noted that, since a peak-to-average ratio of the CP-OFDM is higher than that of the DFT-s-OFDM, a power backoff value needed for the terminal is higher. The base station side may inform a power backoff value so that the terminal may adjust a transmission power. Therefore, the uplink waveform acquisition method in the embodiments of the present disclosure further includes receiving a power backoff value transmitted by the network side, wherein the power backoff value is used by the terminal to adjust a transmission power when the uplink waveform of the terminal is switched between the CP-OFDM and the DFT-s-OFDM.

It should be noted that the power backoff value may be announced by the base station side through a broadcast message, or may be transmitted to the terminal by the base station side at any time when the terminal communicates with the base station side. Optionally, the power backoff value may be communicated to the terminal when the base station informs the terminal of changing the uplink waveform.

In the embodiments of the present disclosure, the uplink waveform of the terminal is determined through the NR in the 5G. The terminal may transmit data according to the uplink waveform. A network communication procedure in the NR of the 5G is supplemented and a reliability of network communication is ensured.

Figure 2:
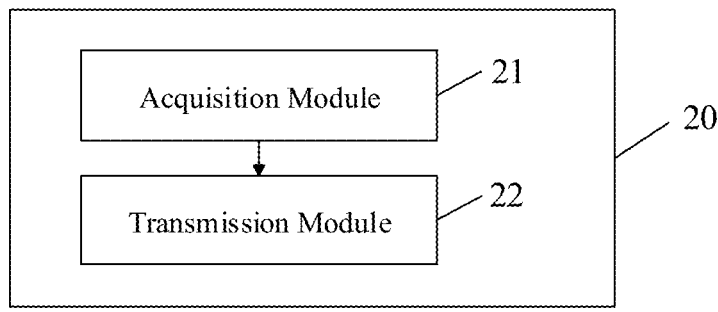
FIG. 2 is a schematic diagram of modules of a terminal according to some embodiments of the present disclosure.

FIG. 2 is a schematic diagram of modules of a terminal according to some embodiments of the present disclosure. The embodiment shown in FIG. 2 of the present disclosure provides a terminal 20. The terminal 20 includes: an acquisition module 21, configured for acquiring information about an uplink an uplink waveform to be used by the terminal for information transmission of the terminal; and a transmission module 22, configured for performing information transmission according to the uplink waveform.

Optionally, the acquiring module 21 includes: a first determination submodule, configured for determining an uplink an uplink waveform to be used by the terminal for current information transmission of the terminal, according to a correspondence between uplink waveforms and preset conditions predetermined in communication protocols; or a first reception submodule, configured for receiving information about an uplink waveform to be used for information transmission of the terminal, the information about the uplink waveform being determined for the terminal and being transmitted through a preset message by the network side; or a second reception submodule, configured for receiving information about the uplink waveform to be used for the information transmission of the terminal, wherein the information about the uplink waveform is fed back to the terminal by the network side according to reporting information from the terminal.

Optionally, the first determination submodule is configured for: determining an uplink waveform to be used for information transmission, according to a correspondence between uplink waveforms and frequency bands predetermined in communication protocols and according to current operational frequency bands or frequencies of the terminal; wherein the frequency bands include licensed frequency bands and unlicensed frequency bands; or the frequency bands include frequency bands having frequencies larger than a first preset frequency and frequency bands having frequencies smaller than or equal to the first preset frequency according to frequency values; or the frequency bands include frequency bands having frequencies larger than or equal to a second preset frequency and frequency bands having frequencies smaller than the second preset frequency according to frequency values.

Optionally, the first determination submodule is configured for: determining an uplink waveform to be used for information transmission according to a correspondence between service types of a terminal and uplink waveforms predetermined in communication protocols and according to a current service type of the terminal.

Optionally, the first determination submodule is configured for: determining an uplink waveform to be used for information transmission according to a correspondence between link types and uplink waveforms predetermined in communication protocols and according to a current link type of the terminal.

Specifically, the preset message is a broadcast message or a dedicated message.

Specifically, the first reception submodule is configured for receiving information about an uplink waveform to be used for the information transmission of the terminal, wherein the information about the uplink waveform is determined by the network side according to frequency bands, a service type of the terminal, a link type, a radius of a cell or a coverage for the terminal, and is transmitted to the terminal through a preset message.

Specifically, the second reception submodule includes a first transmission unit configured for transmitting reporting information to the network side, wherein the reporting information includes downlink measurement result information and/or uplink power information; and a first reception unit configured for receiving the information about the uplink waveform to be used for the information transmission of the terminal, wherein the information about the uplink waveform is determined by the network side according to the reporting information and fed back to the terminal.

Optionally, the first transmission unit is used for transmitting the reporting information to the network side within the random access procedure or after the random access procedure.

Specifically, the first transmission unit includes an obtaining subunit configured for obtaining a reference value of reference data used for generating the reporting information, wherein the reference data includes a pathloss, a downlink reference signal receiving power, a downlink reference signal receiving quality, a current transmission power level or an uplink power headroom; a generation subunit configured for generating the reporting information according to the reference value; a transmission subunit configured for transmitting the reporting information to the network side, wherein, the reporting information includes the reference value or a difference between the reference value and a preconfigured threshold.

Optionally, in a case that the reference data includes the pathloss, the downlink reference signal receiving power or the downlink reference signal receiving quality, the generation subunit is configured for: obtaining an uplink power offset of the terminal; and generating the reporting information according to the uplink power offset and the reference value, wherein the reporting information includes a difference between the reference value and the uplink power offset; or a difference between the difference between the reference value and the uplink power offset and a preconfigured threshold.

In the embodiments, a manner in which the uplink power offset of the terminal is obtained is: obtaining the uplink power offset of the terminal according to a transmission power level of the terminal and a transmission power threshold preconfigured by the network side.

Optionally, in a case that the reporting information includes the difference between the reference value and the preconfigured threshold, the terminal further includes a first reception module configured for receiving the preconfigured threshold transmitted by the network side.

Specifically, in a case that the reporting information includes the difference between the reference value and the preconfigured threshold, the transmission subunit is configured for transmitting the difference between the reference value and the preconfigured threshold to the network side in a case that the difference between the reference value and the preconfigured threshold is smaller than a first preset threshold or smaller than or equal to the first preset threshold, or in a case that the difference between the reference value and the preconfigured threshold is larger than a second preset threshold or larger than or equal to the second preset threshold.

Specifically, in a case that the reference data includes the pathloss or the current transmission power level, the first reception unit is configured for receiving information about the uplink waveform to be used for information transmission of the terminal and being the Cyclic Prefix-Orthogonal Frequency Division Multiplexing, CP-OFDM, wherein the information about the uplink waveform being the CP-OFDM is determined by the network side under a condition that the pathloss or the reference value of the current transmission power level is smaller than a first preset threshold or smaller than or equal to the first preset threshold; or receiving information about an uplink waveform to be used for information transmission of the terminal and being the Discrete Fourier Transform-Spread-Orthogonal Frequency Division Multiplexing, DFT-s-OFDM, wherein the information about the uplink waveform being the DFT-s-OFDM is determined by the network side under a condition that the pathloss or the reference value of the current transmission power level is larger than the first preset threshold or larger than or equal to the first preset threshold.

Specifically, in a case that the reference data includes the downlink reference signal receiving power, the downlink reference signal receiving quality or the uplink power headroom, the first reception unit is configured for: receiving the information about the uplink waveform to be used for information transmission of the terminal, the information about the uplink waveform being a Discrete Fourier Transform-Spread-Orthogonal Frequency Division Multiplexing, DFT-s-OFDM, and being determined by the network side under a condition that a reference value of the downlink reference signal receiving power, a reference value of the downlink reference signal receiving quality or a reference value of the uplink power headroom is smaller than a second preset threshold or smaller than or equal to the second preset threshold; or receiving the information about the uplink waveform to be used for information transmission of the terminal, the information about the uplink waveform being a Cyclic Prefix-Orthogonal Frequency Division Multiplexing, CP-OFDM, and being determined by the network side under a condition that the reference value of the downlink reference signal receiving power, the reference value of the downlink reference signal receiving quality or the reference value of the uplink power headroom is larger than the second preset threshold or larger than or equal to the second preset threshold.

Optionally, the terminal 20 further includes a second reception module configured for receiving a power backoff value transmitted by the network side, wherein the power backoff value is used by the terminal to adjust a transmission power when the uplink waveform of the terminal is switched between the CP-OFDM and the DFT-s-OFDM.

It is noted that, the device in this embodiment is a device capable of performing the uplink waveform acquisition method in the above embodiment correspondingly, and all implementations in the uplink waveform acquisition method in the above embodiment are applicable to the device in this embodiment and may achieve the same technical effect.

Figure 3:
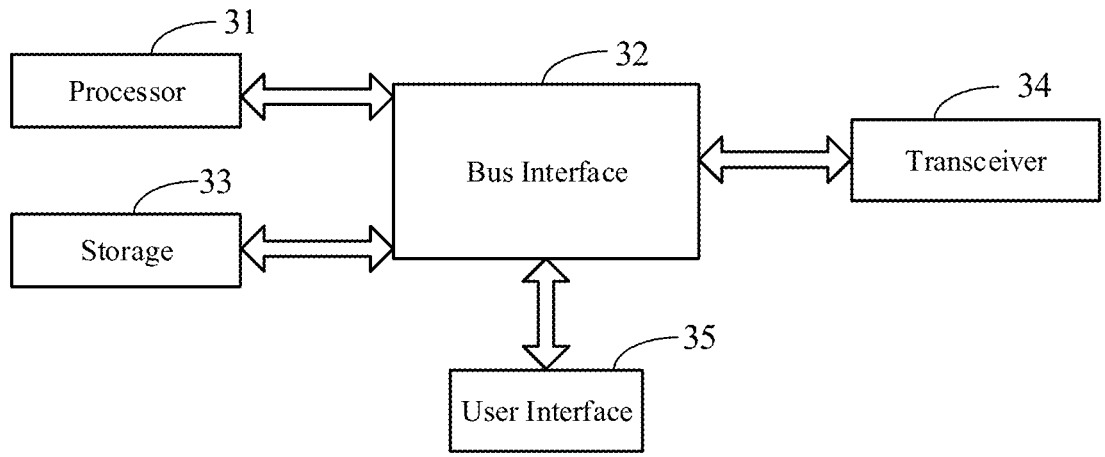
FIG. 3 is a structural schematic diagram of a terminal according to some embodiments of the present disclosure.

FIG. 3 is a structural schematic diagram of a terminal according to some embodiments of the present disclosure. The embodiments of the present disclosure shown in FIG. 3 provide a terminal. The terminal includes a processor 31 and a storage 33 connected to the processor 31 through a bus interface 32.

The storage 33 is configured to store programs and data used by the processor 31 when the processor 31 performs operations, and when the processor 31 invokes and executes the programs and the data stored in the storage 33, the processor 31 performs following steps: acquiring information about an uplink waveform to be used by the terminal for information transmission of the terminal; and transmitting information through a transceiver 34 according to the uplink waveform; wherein the acquiring information about an uplink waveform to be used by the terminal for information transmission of the terminal includes: determining an uplink waveform used by the terminal for current information transmission of the terminal, according to a correspondence between uplink waveforms and preset conditions predetermined in communication protocols; or receiving, through the transceiver 34, information about the uplink waveform determined for the terminal and used for information transmission of the terminal, the information about the uplink waveform being transmitted through a preset message by the network side; or receiving, through the transceiver 34, information about an uplink waveform to be used for information transmission of the terminal, wherein the information about the uplink waveform is fed back to the terminal by the network side according to reporting information reported by the terminal.

The transceiver 34 is connected to the bus interface 32 and is configured to acquire, under a control of the processor 31, uplink waveforms determined by the network side and used by the terminal for information transmission of the terminal.

It should be noted that, in FIG. 3, a bus architecture may include any number of buses and bridges connected together. Specifically, a plurality of processors such as the processor 31 and a plurality of storages such as the storage 33 are connected together. The bus architecture may also cause any other circuits such as a peripheral circuit, a voltage regulator and a power management circuit to be connected together. The circuits are known in the art, and thus detailed descriptions thereof are not further provided herein. A bus interface provides an interface. The transceiver 34 may include a plurality of elements such as receivers, transmitters, and units for communicating with other devices through a transmission medium. Directed to different terminals, the user interface 35 may also be an interface capable of being connected to internal devices and external devices including, but not limited to, keypads, displays, speakers, microphones, joysticks, or the like. The processor 31 takes charge of the bus architecture and general processing transactions. The storage 33 may store data used by the processor 31 when the processor 31 performs operations.

It may be understood that, a part or all of the steps of the above embodiments may be implemented by hardware or may be implemented by computer programs which instruct relevant hardware. The computer programs include instructions for executing a part of all of the steps in the above method, and may be stored in a computer readable storage medium. The computer readable storage medium in the present disclosure may be any type of storage medium.

Figure 4:
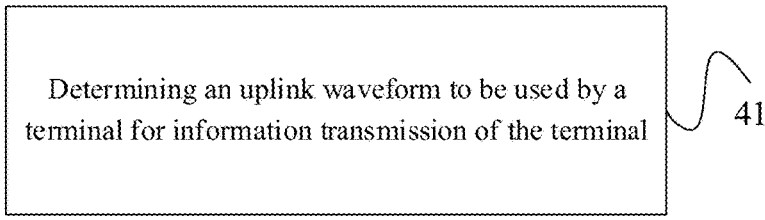
FIG. 4 is a flowchart of an uplink waveform feedback method according to some embodiments of the present disclosure.

FIG. 4 is a flowchart of an uplink waveform feedback method according to some embodiments of the present disclosure. The embodiment shown in FIG. 4 of the present disclosure provides an uplink waveform feedback method. The uplink waveform feedback method includes a step 41: determining an uplink waveform to be used by the terminal for information transmission of the terminal.

The step 41 includes determining, according to a correspondence between uplink waveforms and preset conditions predetermined in communication protocols, the uplink waveform to be used by the terminal for current information transmission of the terminal; or determining an uplink waveform to be used by the terminal for information transmission of the terminal, according to frequency bands, service types of a terminal, link services, sizes of radii of cells or a coverage for a terminal; or determining the uplink waveform to be used by the terminal for information transmission of the terminal according to reporting information transmitted by the terminal.

Optionally, the determining an uplink waveform to be used for current information transmission of the terminal, according to a correspondence between uplink waveforms and preset conditions predetermined in communication protocols includes: determining an uplink waveform to be used for information transmission of the terminal, according to a correspondence between uplink waveforms and frequency bands predetermined in communication protocols and according to current operational frequency bands or frequencies of the terminal; wherein the frequency bands include licensed frequency bands and unlicensed frequency bands; or the frequency bands include frequency bands having frequencies larger than a first preset frequency and frequency bands having frequencies smaller than or equal to the first preset frequency according to frequency values; or the frequency bands include frequency bands having frequencies larger than or equal to a second present frequency and frequency bands having frequencies smaller than the second preset frequency according to frequency values.

Optionally, the determining an uplink waveform to be used for current information transmission of the terminal, according to a correspondence between uplink waveforms and preset conditions predetermined in communication protocols includes: determining an uplink waveform to be used for information transmission according to a correspondence between service types of a terminal and uplink waveforms predetermined in communication protocols and according to a current service type of the terminal.

Optionally, the determining an uplink waveform to be used for current information transmission of the terminal, according to a correspondence between uplink waveforms and preset conditions predetermined in communication protocols includes: determining an uplink waveform to be used for information transmission according to a correspondence between link types and uplink waveforms predetermined in communication protocols and according to a current link type of the terminal.

Specifically, after determining the uplink waveform to be used for information transmission of the terminal according to the frequency bands, the service type of the terminal, the link type, the size of the radius of the cell or a coverage for the terminal, the uplink waveform feedback method further include transmitting information about the uplink waveform to the terminal through a preset message.

The preset message is a broadcast message or a dedicated message.

Optionally, the determining the uplink waveforms used for information transmission of the terminal according to the reporting information reported by the terminal, includes: receiving the reporting information transmitted from the terminal, wherein the reporting information includes downlink measurement result information and/or uplink power information; and determining the uplink waveform to be used for information transmission of the terminal, according to the reporting information.

Specifically, the receiving the reporting information transmitted from the terminal, includes: receiving the reporting information transmitted from the terminal in the random access procedure or after the random access procedure.

Optionally, the receiving the reporting information transmitted by the terminal includes: receiving the reporting information generated by the terminal according to a reference value of reference data, wherein the reference data includes a pathloss, a downlink reference signal receiving power, a downlink reference signal receiving quality, a current transmission power level or an uplink power headroom; the reporting information includes the reference value or a difference between the reference value and a preconfigured threshold.

Optionally, in a case that the reference data includes the pathloss, the downlink reference signal receiving power or the downlink reference signal receiving quality, the receiving the reporting information generated by the terminal according to the reference value of the reference data, includes: receiving the reporting information generated by the terminal according to an uplink power offset and the reference value of the reference data, wherein the reporting information includes a difference between the reference value and the uplink power offset, or a difference between the difference between the reference value and the uplink power offset and a preconfigured threshold.

Optionally, in a case that the reporting information includes the difference between the reference value and the preconfigured threshold, and before the receiving the reporting information generated by the terminal according to the reference value of the reference data, the uplink waveform feedback method further includes: transmitting the preconfigured threshold to the terminal.

Specifically, in a case that the reporting information includes the difference between the reference value and the preconfigured threshold, and before receiving the reporting information transmitted by the terminal, the uplink waveform feedback method further includes: transmitting to the terminal a preset rule under which the terminal feeds back the reporting information. The preset rule is that the terminal transmits the reporting information under a condition that the difference between the reference value and the preconfigured threshold is smaller than a first preset threshold or smaller than or equal to the first preset threshold, or under a condition that the difference between the reference value and the preconfigured threshold is larger than a second preset threshold or larger than or equal to the second preset threshold.

Specifically, in a case that the reference data includes a pathloss or a current transmission power level, the determining, according to the reporting information, the uplink waveform to be used for information transmission of the terminal, includes: determining the uplink waveform to be used for information transmission of the terminal to be the Cyclic Prefix-Orthogonal Frequency Division Multiplexing (CP-OFDM), under a condition that the pathloss or the reference value of the current transmission power level is smaller than a first preset threshold or smaller than or equal to the first preset threshold; or determining the uplink waveform used for information transmission of the terminal to be the Discrete Fourier Transform-Spread-Orthogonal Frequency Division Multiplexing (DFT-s-OFDM), under a condition that the pathloss or the reference value of the current transmission power level is larger than the first preset threshold or larger than or equal to the first preset threshold.

Specifically, in a case that the reference data includes the downlink reference signal receiving power, the downlink reference signal receiving quality or an uplink power headroom, the determining, according to the reporting information, the uplink waveform to be used for information transmission of the terminal includes: determining the uplink waveform used for information transmission of the terminal to be the DFT-s-OFDM, under a condition that a reference value of the downlink reference signal receiving power, the downlink reference signal receiving quality or the uplink power headroom is smaller than a second preset threshold or smaller than or equal to the second preset threshold; or determining the uplink waveform used for information transmission of the terminal to be the CP-OFDM, under a condition that the reference value of the downlink reference signal receiving power, the downlink reference signal receiving quality or the uplink power headroom is larger than the second preset threshold or larger than or equal to the second preset threshold.

Optionally, the uplink waveform feedback method further includes: transmitting a power backoff value to the terminal, wherein the power backoff value is used by the terminal to adjust a transmission power when the uplink waveform of the terminal is switched between the CP-OFDM and the DFT-s-OFDM.

All description in the embodiment shown in FIG. 1 related to the base station is applicable to the uplink waveform feedback method applied in a base station in the present disclosure and same technical effects may be obtained.

Figure 5:
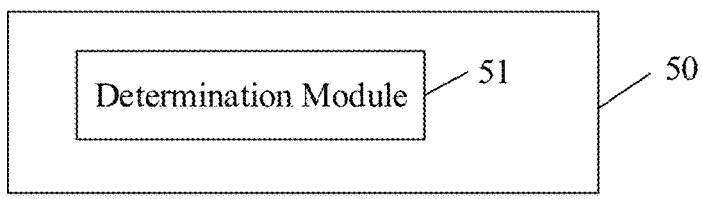
FIG. 5 is a schematic diagram of modules of a base station according to some embodiments of the present disclosure.

FIG. 5 is a s schematic diagram of modules of a base station according to some embodiments of the present disclosure. The embodiment shown in FIG. 5 of the present disclosure provides a base station 50. The base station 50 includes a determination module 51 configured for determining an uplink waveform to be used by the terminal for information transmission of the terminal.

The determination module 51 includes a second determination submodule configured for determining an uplink waveform to be used for current information transmission of the terminal, according to a correspondence between uplink waveforms and preset conditions predetermined in communication protocols; or a third determination submodule configured for determining an uplink waveform to be used for information transmission of the terminal, according to frequency bands, service types of a terminal, link services, sizes of radii of cells or coverages of terminal; or a fourth determination submodule configured for determining the uplink waveform used for information transmission of the terminal according to reporting information reported by the terminal.

Optionally, the second determination submodule is configured for: determining an uplink waveform to be used for information transmission, according to a correspondence between uplink waveforms and frequency bands predetermined in communication protocols and according to current operational frequency bands or frequencies of a terminal; wherein the frequency bands include licensed frequency bands and unlicensed frequency bands; or the frequency bands include frequency bands having frequencies larger than a first preset frequency and frequency bands having frequencies smaller than or equal to the first preset frequency according to frequency values; or the frequency bands include frequency bands having frequencies larger than or equal to a second preset frequency and frequency bands having frequencies smaller than the second preset frequency according to frequency values.

Optionally, the second determination submodule is configured for: determining an uplink waveform to be used for information transmission according to a correspondence between service types of a terminal and uplink waveforms predetermined in communication protocols and according to a current service type of the terminal.

Optionally, the second determination submodule is configured for: determining an uplink waveform to be used for information transmission according to a correspondence between link types and uplink waveforms predetermined in communication protocols and according to a current link type of the terminal.

Optionally, in a case that the determination module includes the third determination submodule, the base station 50 further includes: an announcing module configured for announcing the information about the uplink waveform to the terminal through a preset message. The preset message is a broadcast message or a dedicated message.

Specifically, the fourth determination submodule includes a second reception unit configured for receiving the reporting information transmitted by the terminal, the reporting information including downlink measurement result information and/or uplink power information; and a determination unit configured for determining, according to the reporting information, the uplink waveform to be used for information transmission of the terminal.

Optionally, the second reception unit is used for receiving the reporting information transmitted by the terminal in the random access procedure or after the random access procedure.

Optionally, the second reception unit is configured for receiving the reporting information generated by the terminal according to a reference value of reference data, wherein the reference data includes a pathloss, a downlink reference signal receiving power, a downlink reference signal receiving quality, a current transmission power level or an uplink power headroom. The reporting information includes a reference value or a difference between the reference value and a preconfigured threshold.

Optionally, in a case that the reference data includes the pathloss, the downlink reference signal receiving power or the downlink reference signal receiving quality, the second reception unit is configured for: receiving reporting information generated by the terminal according to an uplink power offset and the reference value of the reference data, wherein the reporting information includes a difference between the reference value and the uplink power offset, or a difference between the difference between the reference value and the uplink power offset and the preconfigured threshold.

Optionally, in a case that the reporting information includes the difference between the reference value and the preconfigured threshold, the base station further includes a first transmission module configured for transmitting the preconfigured threshold to the terminal.

Specifically, in a case that the reporting information includes the difference between the reference value and the preconfigured threshold, the base station further includes a second transmission module configured for transmitting to the terminal a preset rule under which the terminal feeds back the reporting information. The preset rule is that the terminal transmits the reporting information under a condition that the difference between the reference value and the preconfigured threshold is smaller than a first preset threshold or smaller than or equal to the first preset threshold, or under a condition that the difference between the reference value and the preconfigured threshold is larger than a second preset threshold or larger than or equal to the second preset threshold.

Specifically, in a case that the reference data includes the pathloss or the current transmission power level, the determination unit is configured for determining the uplink waveform used for information transmission of the terminal to be the Cyclic Prefix-Orthogonal Frequency Division Multiplexing (CP-OFDM), under a condition that the pathloss or the reference value of the current transmission power level is smaller than a first preset threshold or smaller than or equal to the first preset threshold; or determining the uplink waveform used for information transmission of the terminal to be the Discrete Fourier Transform-Spread-Orthogonal Frequency Division Multiplexing (DFT-s-OFDM), under a condition that the pathloss or the reference value of the current transmission power level is larger than the first preset threshold or larger than or equal to the first preset threshold.

Specifically, in a case that the reference data includes the downlink reference signal receiving power, the downlink reference signal receiving quality or the uplink power headroom, the determination unit is configured for: determining the uplink waveform used for information transmission of the terminal to be the DFT-s-OFDM, under a condition that a reference value of the downlink reference signal receiving power, a reference value of the downlink reference signal receiving quality or a reference value of the uplink power headroom is smaller than a second preset threshold or smaller than or equal to the second preset threshold; or determining the uplink waveform used for information transmission of the terminal to be the CP-OFDM, under a condition that the reference value of the downlink reference signal receiving power, the reference value of the downlink reference signal receiving quality or the reference value of the uplink power headroom is larger than the second preset threshold or larger than or equal to the second preset threshold.

Optionally, the base station 50 further includes a third transmission module configured for transmitting a power backoff value to the terminal, wherein the power backoff value is used by the terminal to adjust a transmission power when the uplink waveform of the terminal is switched between the CP-OFDM and the DFT-s-OFDM.

It is noted that, the base station in this embodiment is a base station capable of performing the uplink waveform feedback method in the above embodiment correspondingly, and all implementations in the uplink waveform feedback method in the above embodiment are applicable to the base station in this embodiment and may achieve the same technical effect.

Figure 6:
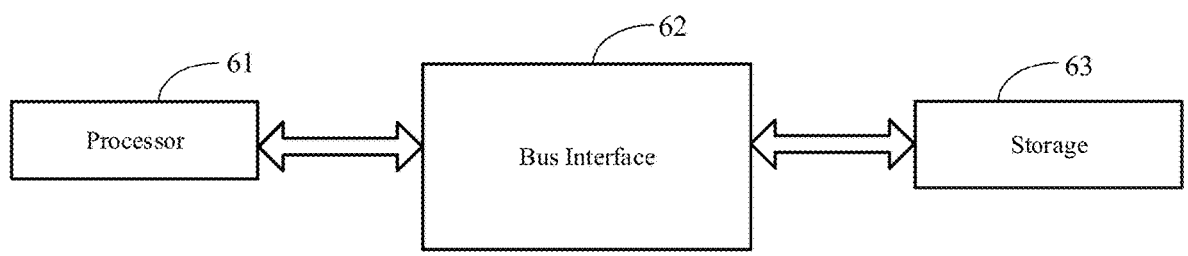
FIG. 6 is a structural schematic diagram of a base station according to some embodiments of the present disclosure.

FIG. 6 is a structural schematic diagram of a base station according to some embodiments of the present disclosure. The embodiment shown in FIG. 6 of the present disclosure provides a base station. The base station includes a processor 61 and a storage 63 connected to the processor 61 through a bus interface 62.

The storage 63 is configured to store programs and data used by the processor 61 when the processor 61 performs operations, and when the processor 61 invokes and executes the programs and the data stored in the storage 63, the processor 61 performs following steps: determining an uplink waveform to be used for information transmission of the terminal. The determining the uplink waveform to be used for information transmission of the terminal, includes: determining the uplink waveform to be used for current information transmission of the terminal, according to a correspondence between uplink waveforms and preset conditions predetermined in communication protocols; or determining the uplink waveform to be used for information transmission of the terminal, according to frequency bands, service types of the terminal, link services, sizes of radii of cells or coverages of terminal; or determining the uplink waveform to be used for information transmission of the terminal according to reporting information reported by the terminal.

It should be noted that the processor 61 is further configured to implement a function of any of the modules or the units in the above base station.

It should be noted that, in FIG. 6, a bus architecture may include any number of buses and bridges connected together. Specifically, a plurality of processors such as the processor 61 and a plurality of storages such as the storage 63 are connected together. The bus architecture may also cause any other circuits such as a peripheral circuit, a voltage regulator and a power management circuit to be connected together. The circuits are known in the art, and thus detailed descriptions thereof are not further provided herein. The bus interface provides an interface. The processor 61 takes charge of the bus architecture and general processing transactions. The storage 63 may store data used by the processor 61 when the processor 61 performs operations.

In the embodiments of the present disclosure, the uplink waveform of the terminal is determined in the NR in the 5G. The terminal may transmit data according to the uplink waveform. A network communication procedure in the NR of the 5G is supplemented and a reliability of network communication is ensured.

It may be understood that, a part or all of the steps of the above embodiments may be implemented by hardware or by computer programs instructing relevant hardware. The computer programs include instructions for executing a part of all of the steps in the above method, and may be stored in a computer readable storage medium. The computer readable storage medium in the present disclosure may be any type of storage medium.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. An uplink waveform acquisition method, comprising:
   acquiring an uplink waveform to be used by a terminal for information transmission of the terminal; and performing information transmission according to the uplink waveform, wherein, the acquiring the uplink waveform to be used by the terminal for information transmission of the terminal, comprises:

transmitting reporting information to the network side, the reporting information comprising downlink measurement result information or uplink power information; and receiving information about the uplink waveform to be used for information transmission of the terminal, the information about the uplink waveform being determined by the network side according to the reporting information and fed back to the terminal, wherein, the transmitting the reporting information to the network side, comprises:

obtaining a reference value of reference data used for generating the reporting information, wherein the reference data comprises a downlink reference signal receiving power, a downlink reference signal receiving quality, or a current transmission power level;

generating the reporting information according to the reference value; and transmitting the reporting information to the network side, wherein the reporting information comprises a reference value or a difference between the reference value and a preconfigured threshold, when the reference data comprises the downlink reference signal receiving power or the downlink reference signal receiving quality, the generating the reporting information according to the reference value, comprises:

obtaining an uplink power offset of the terminal;

generating the reporting information according to the uplink power offset and the reference value, wherein the reporting information comprises a difference among the reference value, the uplink power offset, and a preconfigured threshold.

2. The uplink waveform acquisition method according to claim 1, wherein, the transmitting the reporting information to the network side, comprises:

transmitting the reporting information to the network side in a random access procedure or after the random access procedure.

3. The uplink waveform acquisition method according to claim 1, wherein, when the reporting information comprises a difference between the reference value and a preconfigured threshold, before generating the reporting information according to the reference value, the uplink waveform acquisition method further comprises:

receiving the preconfigured threshold transmitted by the network side.

4. The uplink waveform acquisition method according to claim 1, wherein, when the reference data comprises the current transmission power level, the receiving the information about the uplink waveform to be used for information transmission of the terminal, the information about the uplink waveform being determined by the network side according to the reporting information and fed back to the terminal, comprises:

receiving information about the uplink waveform to be used for information transmission of the terminal, the information about the uplink waveform being a Cyclic Prefix-Orthogonal Frequency Division Multiplexing CP-OFDM and being determined by the network side under a condition that the reference value of the current transmission power level is smaller than a first preset threshold or smaller than or equal to the first preset threshold.

5. The uplink waveform acquisition method according to claim 1, further comprising:

receiving a power backoff value transmitted by the network side, wherein the power backoff value is used by the terminal to adjust a transmission power when the uplink waveform of the terminal is switched between a Cyclic Prefix-Orthogonal Frequency Division Multiplexing CP-OFDM and a Discrete Fourier Transform-Spread-Orthogonal Frequency Division Multiplexing DFT-s-OFDM.

6. The uplink waveform acquisition method according to claim 1, wherein when the reporting information comprises a difference between the reference value and a preconfigured threshold, the transmitting the reporting information to the network side, comprises:

transmitting the difference between the reference value and the preconfigured threshold to the network side, when the difference between the reference value and the preconfigured threshold is smaller than a first preset threshold or smaller than or equal to the first preset threshold, or when the difference between the reference value and the preconfigured threshold is larger than a second preset threshold or larger than or equal to the second preset threshold.

7. The uplink waveform acquisition method according to claim 1, wherein, when the reference data comprises the current transmission power level, the receiving the information about the uplink waveform to be used for information transmission of the terminal, the information about the uplink waveform being determined by the network side according to the reporting information and fed back to the terminal, comprises:

receiving information about the uplink waveform to be used for information transmission of the terminal, the information about the uplink waveform being a Discrete Fourier Transform-Spread-Orthogonal Frequency Division Multiplexing DFT-s-OFDM and being determined by the network side under a condition that the reference value of the current transmission power level is larger than the first preset threshold or larger than or equal to the first preset threshold.

8. The uplink waveform acquisition method according to claim 1, wherein, when the reference data comprises the downlink reference signal receiving power or the downlink reference signal receiving quality, the receiving the information about the uplink waveform to be used for information transmission of the terminal, the information about the uplink waveform being determined by the network side according to the reporting information and fed back to the terminal, comprises:

receiving the information about the uplink waveform to be used for information transmission of the terminal, the information about the uplink waveform being a Discrete Fourier Transform-Spread-Orthogonal Frequency Division Multiplexing DFT-s-OFDM and being determined by the network side under a condition that a reference value of the downlink reference signal receiving power or a reference value of the downlink reference signal receiving quality is smaller than a second preset threshold or smaller than or equal to the second preset threshold.

9. The uplink waveform acquisition method according to claim 1, wherein, when the reference data comprises the downlink reference signal receiving power or the downlink reference signal receiving quality, the receiving the information about the uplink waveform to be used for information transmission of the terminal, the information about the uplink waveform being determined by the network side according to the reporting information and fed back to the terminal, comprises:
  receiving the information about the uplink waveform to be used for information transmission of the terminal, the information about the uplink waveform being a Cyclic Prefix-Orthogonal Frequency Division Multiplexing CP-OFDM and being determined by the network side under a condition that the reference value of the downlink reference signal receiving power or the reference value of the downlink reference signal receiving quality is larger than the second preset threshold or larger than or equal to the second preset threshold.

10. The uplink waveform acquisition method according to claim 1, wherein, the obtaining the uplink power offset of the terminal, comprises:
  obtaining the uplink power offset of the terminal according to a transmission power level of the terminal and a transmission power threshold preconfigured by the network side.

11. A terminal, comprising:
  a processor;
  a storage, connected to the processor through a bus interface and configured for storing programs and data used in a process of performing operations by the processor;
  wherein, when the processor invokes and executes the programs and the data stored in the storage, the processor performs the method according to claim 1.

12. An uplink waveform feedback method, comprising:
  receiving reporting information transmitted by a terminal, the reporting information comprising downlink measurement result information or uplink power information;
  determining the uplink waveform to be used for information transmission of the terminal, according to the reporting information; and
  feeding back, to the terminal, information about the uplink waveform to be used for information transmission of the terminal,
  wherein receiving the reporting information transmitted by the terminal, comprises:
  receiving the reporting information generated by the terminal according to a reference value of reference data, wherein the reference data comprises a downlink reference signal receiving power, a downlink reference signal receiving quality, or a current transmission power level; the reporting information comprises a reference value or a difference between the reference value and a preconfigured threshold,
  when the reference data comprises the downlink reference signal receiving power or the downlink reference signal receiving quality, the receiving the reporting information generated by the terminal according to the reference value of the reference data, comprises:
  receiving the reporting information generated by the terminal according to an uplink power offset and the reference value of the reference data,
  wherein the reporting information comprises a difference among the reference value, the uplink power offset, and a preconfigured threshold.

13. The uplink waveform feedback method according to claim 12, wherein, the receiving the reporting information transmitted by the terminal, comprises:
  receiving the reporting information transmitted by the terminal in a random access procedure or after the random access procedure.

14. The uplink waveform feedback method according to claim 12, wherein, that when the reporting information comprises the difference between the reference value and the preconfigured threshold, and before the receiving the reporting information generated by the terminal according to the reference value of the reference data, the uplink waveform feedback method further comprises:
  transmitting the preconfigured threshold to the terminal.

15. The uplink waveform feedback method according to claim 12, wherein, when the reference data comprises the current transmission power level, the determining the uplink waveform to be used or information transmission of the terminal according to the reporting information comprises:
  determining the uplink waveform used for information transmission of the terminal, to be a Cyclic Prefix-Orthogonal Frequency Division Multiplexing (CP-OFDM), under a condition that the reference value of the current transmission power level is smaller than a first preset threshold or smaller than or equal to the first preset threshold; and
  determining the uplink waveform used for information transmission of the terminal, to be a Discrete Fourier Transform-Spread-Orthogonal Frequency Division Multiplexing (DFT-s-OFDM), under a condition that the reference value of the current transmission power level is larger than the first preset threshold or larger than or equal to the first preset threshold.

16. The uplink waveform feedback method according to claim 12, further comprising:
  transmitting a power backoff value to the terminal, wherein the power backoff value is used by the terminal to adjust a transmission power when the uplink waveform of the terminal is switched between a Cyclic Prefix-Orthogonal Frequency Division Multiplexing (CP-OFDM) and a Discrete Fourier Transform-Spread-Orthogonal Frequency Division Multiplexing (DFT-s-OFDM).

17. The uplink waveform feedback method according to claim 12, wherein, when the reporting information comprises the difference between the reference value and the preconfigured threshold, and before receiving the reporting information generated by the terminal, the uplink waveform feedback method further comprises:
  transmitting to the terminal a preset rule under which the terminal feeds back the reporting information, wherein the preset rule is that the terminal transmits the reporting information under a condition that the difference between the reference value and the preconfigured threshold is smaller than a first preset threshold or smaller than or equal to the first preset threshold, or under a condition that the difference between the reference value and the preconfigured threshold is larger than a second preset threshold or larger than or equal to the second preset threshold.

18. The uplink waveform feedback method according to claim 12, wherein,
  when the reference data comprises the downlink reference signal receiving power or the downlink reference signal receiving quality, the determining the uplink waveform to be used by the terminal for information transmission of the terminal according to reporting information transmitted by the terminal comprises:

determining the uplink waveform to be used for information transmission of the terminal, to be a Discrete Fourier Transform-Spread-Orthogonal Frequency Division Multiplexing (DFT-s-OFDM), under a condition that the reference value of the downlink reference signal receiving power, the reference value of the downlink reference signal receiving quality is smaller than a second preset threshold or smaller than or equal to the second preset threshold; and determining the uplink waveform used for information transmission of the terminal, to be a Cyclic Prefix-Orthogonal Frequency Division Multiplexing (CP-OFDM), under a condition that the reference value of the downlink reference signal receiving power or the reference value of the downlink reference signal receiving quality is larger than the second preset threshold or larger than or equal to the second preset threshold.

19. A base station, comprising:
a processor;
a storage, connected to the processor through a bus interface and configured for storing programs and data used in a process of performing operations by the processor;
wherein, when the processor invokes and executes the programs and the data stored in the storage, the processor performs the method according to claim 12.

\* \* \* \* \*